B. E. VIELE.
BEARING COOLING DEVICE.
APPLICATION FILED MAR. 1, 1916.
1,236,238.
Patented Aug. 7, 1917.
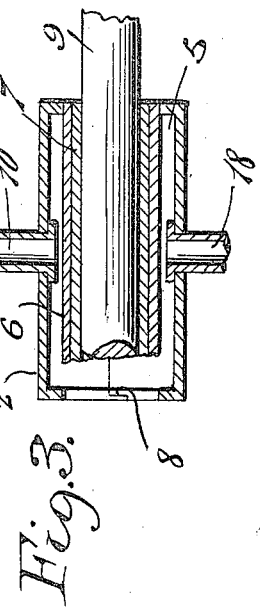
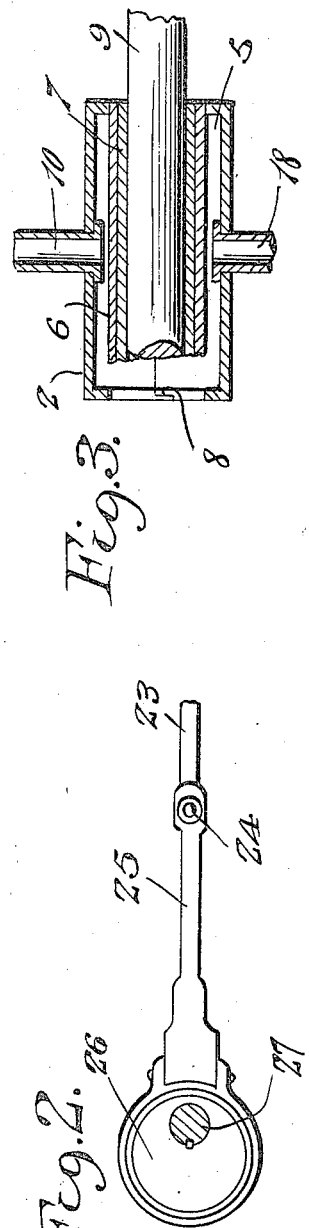
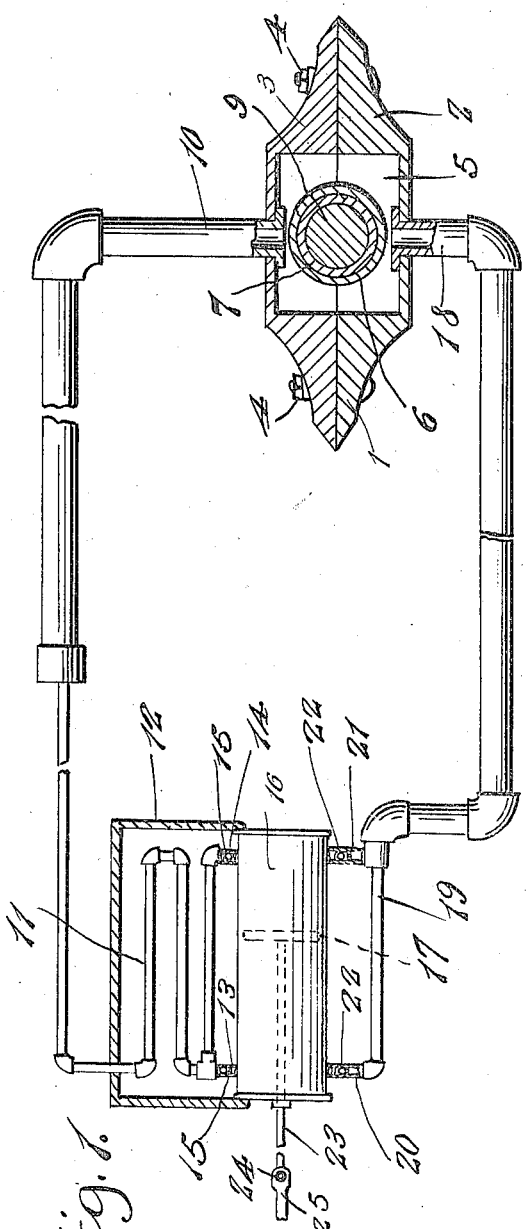
Inventor
B. E. Viele,

UNITED STATES PATENT OFFICE.

BYRON E. VIELE, OF GRINNELL, IOWA.

BEARING-COOLING DEVICE.

1,236,238.   Specification of Letters Patent.   Patented Aug. 7, 1917.

Application filed March 1, 1916. Serial No. 81,466.

*To all whom it may concern:*

Be it known that I. BYRON E. VIELE, a citizen of the United States, residing at Grinnell, in the county of Poweshiek and State of Iowa, have invented certain new and useful Improvements in Bearing-Cooling Devices; and I do hereby declare the following to be a full, clear, and exact description of the invention, such as will enable others skilled in the art to which it appertains to make and use the same.

This invention relates to a device for cooling bearings, such as are used upon engines, railroad cars, vehicles, line shafts, or the like, and the primary object of the invention is to provide a device as specified which will prevent excessive heating of the bearings during the rotation of shafts therein.

Another object of this invention is to provide, in a device as specified, a hollow bearing box, through which a cooling liquid is circulated, by suitable liquid circulating means.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:

Figure 1 is a view partly in perspective and partly in elevation and also showing parts in section, illustrating the improved device for cooling bearings.

Fig. 2 is a fragmentary view of the device, and

Fig. 3 is a longitudinal section through the bearing box.

Referring more particularly to the drawings, 1 designates the bearing box as an entirety which is composed of sections 2 and 3 connected in any suitable manner, such as by means of bolts or analogous connecting devices illustrated at 4. The sections 2 and 3 of the bearing box are hollow, providing a space 5 internally thereof, in which the bearing sleeves 6 and 7 are mounted. The sections 2 and 3 have overlapping joints indicated at 8, so as to provide a fluid tight compartment 5 interiorly of the bearing box. The sleeves 6 and 7 are of the ordinary material used in forming bearing sleeves for instance the sleeve 7 is formed of Babbitt metal, brass or the like. The shaft 9 rotates interiorly of the sleeve 7. A cooling fluid inlet pipe 10 communicates with the upper portion of the space 5, and with a cooling coil 11, which may be positioned interiorly of a cooling chamber 12, if it is so desired.

The coil 11 has relatively short lengths 13 and 14 of pipe communicating therewith, in which are seated valves 15. The pipes 13 and 14 communicate with the interior of a cylinder 16, in which is mounted a reciprocatory piston 17. The pipe 13 communicates with the cylinder 16 adjacent one end thereof, while the pipe 14 communicates with the cylinder adjacent the opposite end as clearly shown in Fig. 1 of the drawings.

The cooling liquid outlet pipe 18 communicates with the bottom of the compartment 5 and with a pipe 19 to which are attached relatively short lengths of pipe 20 and 21 which communicate with the cylinder casing 16 diametrically opposite of the pipes 13 and 14 respectively. The pipes 20 and 21 have valves 22 mounted therein controlling the passage of the cooling fluid therethrough.

The piston 17 has a piston rod 23 connected thereto, which is in turn pivotally connected as is shown at 24, to an arm 25. The arm 25 is connected to an eccentric 26 which is carried by the axle 27 of the railway car when the device is mounted upon a railway car or analogous structure and when it is used for cooling the boxes or bearings for shafts, the shaft 27 is propelled in any suitable manner for rotating the eccentric 26, for reciprocating the piston rods 23. The valves 15 and 23 which are carried by the pipes 14 and 21 respectively, are arranged so that upon the outward stroke of the piston 17, the valve 22 will be opened for sucking the cooling liquid into the cylinder 16, and the valve 15 closed for preventing the outlet of the liquid from the same. The valves 15 and 22 which are carried by the pipes 13 and 20 respectively are arranged so that upon the outstroke of the piston 17, the valve 20 will be closed and the valve 15 opened for permitting the cooling liquid to pass upwardly through the pipe 13, cooling coil 11 and the inlet pipe 10 into the compartment 5 which surrounds the bearing sleeves on the shaft. Upon the instroke of the piston 17, the valve 15 carried by the pipe 13 is closed and the valve 22 carried by the pipe 20 is opened while the valve 22 carried by the pipe 21 is closed and the valve 15 carried by the pipe 14 opened which permits of the forcing of the liquid outwardly through the pipe 14 and coil 11 and the pipe 10 and sucking the liquid into the cylinder outwardly the piston 17, through the pipes 19 and 20.

In reducing the invention to practice certain minor features of construction, combination and arrangement of parts may be altered to suit practical conditions provided such alterations are comprehended within the scope of what is claimed.

What is claimed is:—

In a bearing cooling device, the combination with a bearing box having a cooling liquid circulating space, of an inlet pipe communicating with said space, an outlet pipe communicating with said space, a pipe of reduced diameter connected to said inlet pipe, a pipe of reduced diameter connected to said outlet pipe, a cooling coil connected to the reduced pipe which is connected to the inlet pipe, a pump including a cylinder and a reciprocatory piston mounted within said cylinder, check valves connected to said cooling coil and to said cylinder, one upon each side of the pump piston, check valves connected to the reduced outlet pipe and to said cylinder, one upon each side of the piston, said check valves arranged so that an inflow will always be maintained upon one side of the piston, and an outflow upon the other side of the piston, thereby causing a constant flow of water through said pump, pipe and circulating space.

In testimony whereof I affix my signature in presence of two witnesses.

BYRON E. VIELE.

Witnesses:
L. L. POWERS,
H. C. GRAY.

Copies of this patent may be obtained for five cents each, by addressing the "Commissioner of Patents, Washington, D. C."